No. 660,071. Patented Oct. 16, 1900.
J. R. CAVANAGH.
MAP.
(Application filed Feb. 26, 1900.)
(No Model.)
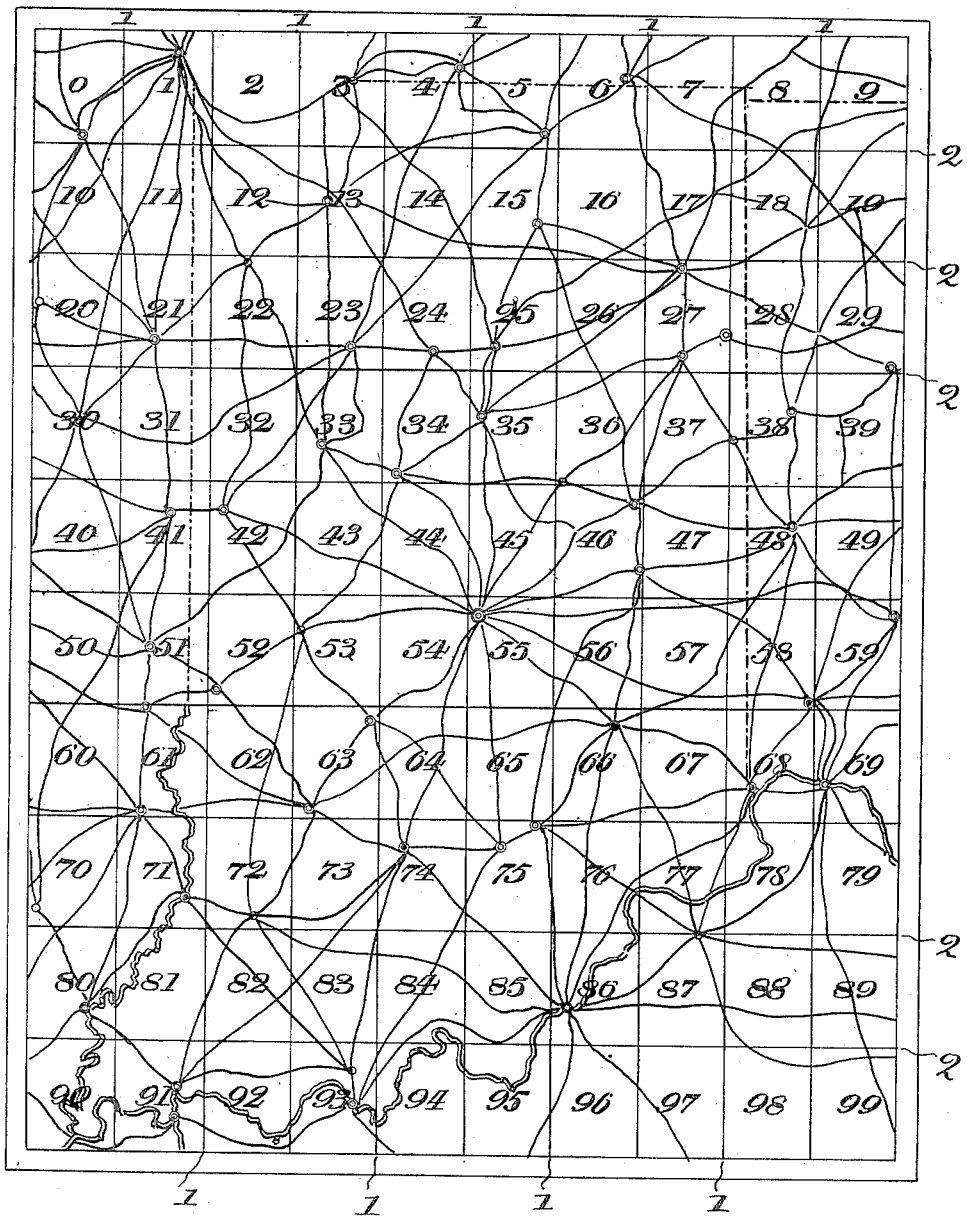
WITNESSES:
INVENTOR
Joseph R. Cavanagh
BY
Attorneys

UNITED STATES PATENT OFFICE.

JOSEPH R. CAVANAGH, OF INDIANAPOLIS, INDIANA, ASSIGNOR TO THE MERCHANTILE GUIDE AND BUREAU COMPANY, OF SAME PLACE.

MAP.

SPECIFICATION forming part of Letters Patent No. 660,071, dated October 16, 1900.

Application filed February 26, 1900. Serial No. 6,598. (No model.)

*To all whom it may concern:*

Be it known that I, JOSEPH R. CAVANAGH, a citizen of the United States, residing at Indianapolis, in the county of Marion and State of Indiana, have invented certain new and useful Improvements in Maps, of which the following is a specification, reference being had therein to the accompanying drawing.

My invention relates to maps, and more particularly to means for subdividing a map-index into sections, the object being to avoid the double-index system now in common use and to afford a simple direct means for referring to any section upon the map.

The characteristic feature of the invention will be fully described hereinafter in connection with the accompanying drawing, which forms a part of this specification and which represents a plan of a map divided into sections in accordance with my invention.

The map is divided by parallel equidistant vertical lines 1 and parallel equidistant horizontal lines 2 into squares or sections of equal area, and each of said sections is given a distinguishing number. These numbers are arranged consecutively, running from "0" upward, the terminating number here shown being "99." It will be observed, however, that the sections are numbered, consecutively, from left to right in transverse rows from the top to the bottom, beginning at the upper left-hand corner and terminating at the lower right-hand corner of the map, and are so arranged as that in any given vertical column or row of sections the numerals in the units place in all the numbers designating the sections composing such column are identical throughout and the numerals in the tens place of such designating-numbers reading downward run, consecutively, from "1" to "9," &c. It is also apparent that in any given transverse or horizontal row of sections the numerals in the units place in all the designating-numbers and reading from left to right run, consecutively, from "0" to "9," and the numerals in the tens place are identical throughout. This arrangement of indicating-numbers and divisions enables one to directly refer to any given subdivision upon the map-index without calculation or loss of time.

In the map-indexes now in common use a series of letters are located in a column at the left of the map and a horizontal row of figures is printed at the top of the map. To find a town or point on the map with this old system of index designations, it is necessary to find a letter at one side of the map, then a figure at the top thereof, and to follow either with the eye or a pointer the two lines leading from the letter and figure until they intersect, which will give you the location desired. With my system if a town is referred to as in section "0" or any other section the eye quickly discovers this section without the inconvenience and delay of the calculation required for tracing out intersecting lines.

I claim—

1. A map-index divided by parallel vertical lines and parallel horizontal lines into sections of equal area, said sections being numbered consecutively from left to right in transverse rows from the top to the bottom, beginning at the upper left-hand corner and terminating at the lower right-hand corner of the map, and being so arranged as that in any given vertical column or row of sections the numerals in the units place in all the numbers designating the sections composing such column shall be identical throughout, and the numerals in the tens place in said designating-numbers reading downward, shall run consecutively from "1" to "9."

2. A map-index divided by parallel vertical lines and parallel horizontal lines into sections of equal area, said sections being numbered consecutively from left to right in transverse rows from the top to the bottom, beginning at the upper left-hand corner and terminating at the lower right-hand corner of the map, and being so arranged as that in any given transverse or horizontal row of sections the numerals in the units place in all the numbers designating the sections composing such row, reading from left to right, shall run consecutively from "0" to "9," and the numerals in the tens place in said designating-numbers shall be identical throughout.

In testimony whereof I affix my signature in presence of two witnesses.

JOSEPH R. CAVANAGH.

Witnesses:
ANNA E. GOGGIN,
E. P. VANEL.